Dec. 22, 1942.          W. F. ROBERTS          2,305,995
AUTO GLASS REMOVING AND REPLACEMENT TOOL
Filed Oct. 17, 1940          3 Sheets-Sheet 1

W. F. Roberts
INVENTOR.

BY *[signature]*

ATTORNEYS.

Dec. 22, 1942.     W. F. ROBERTS     2,305,995
AUTO GLASS REMOVING AND REPLACEMENT TOOL
Filed Oct. 17, 1940     3 Sheets-Sheet 2
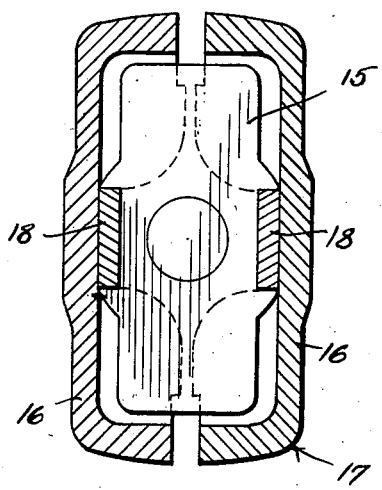
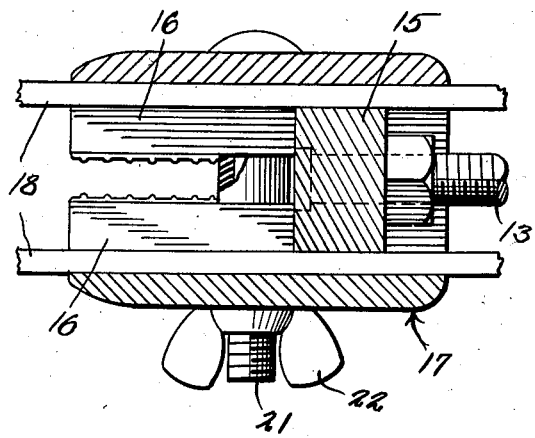
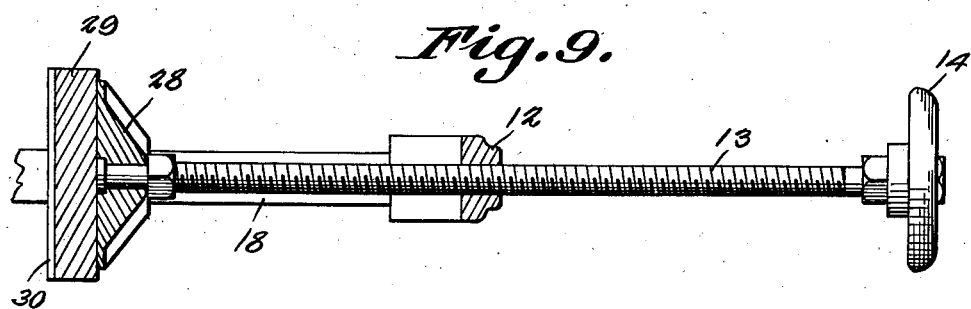
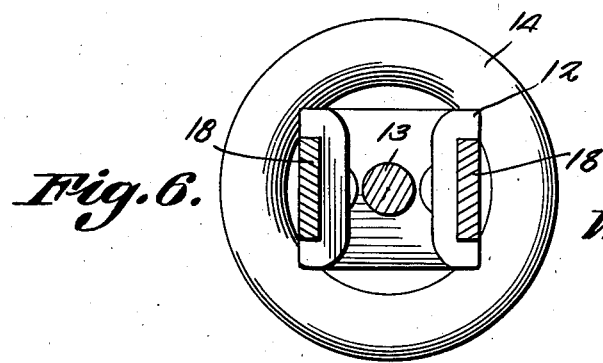
W. F. Roberts
INVENTOR.
ATTORNEYS.

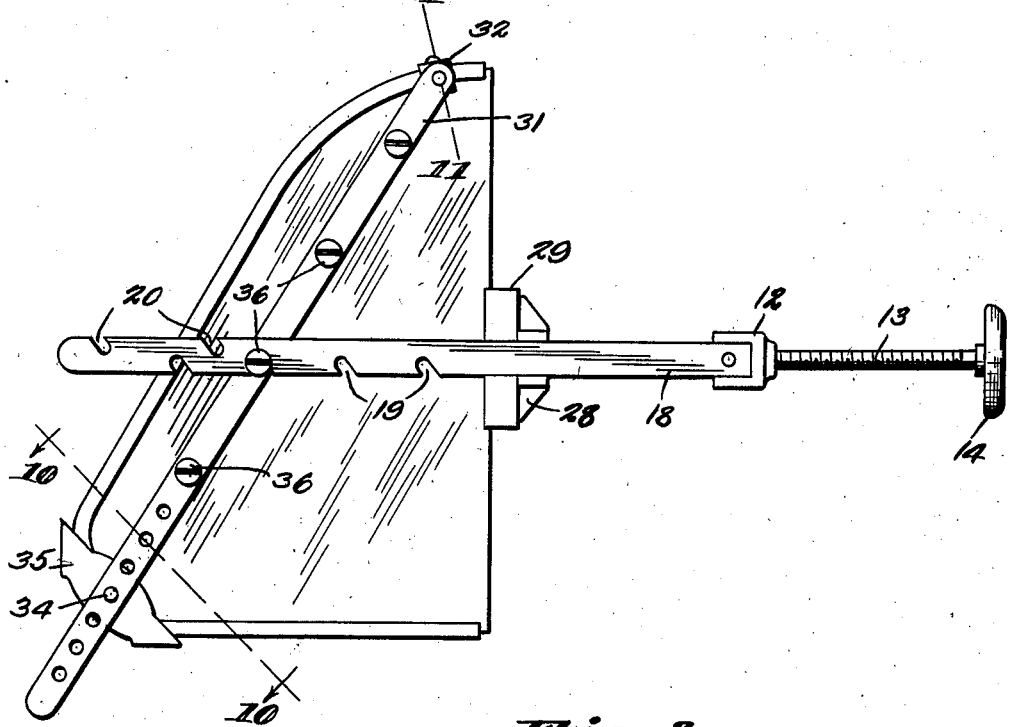
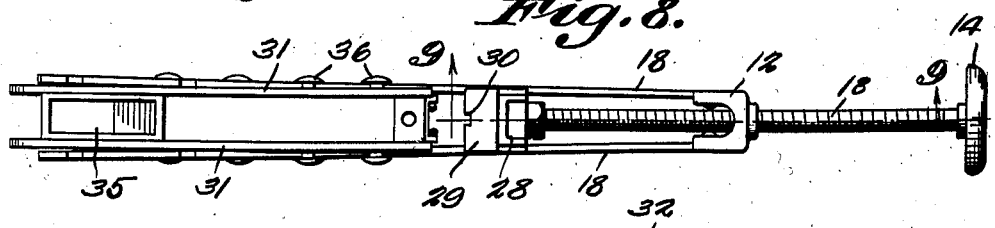
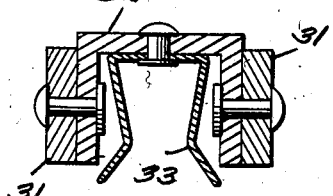

Patented Dec. 22, 1942

2,305,995

UNITED STATES PATENT OFFICE 2,305,995

AUTO GLASS REMOVING AND REPLACEMENT TOOL

William F. Roberts, Gallup, N. Mex.

Application October 17, 1940, Serial No. 361,631

1 Claim. (Cl. 29—84)

This invention relates to a tool or clamp designed for use in replacing the glass of the ventilating sections of motor vehicle windows.

An important object of the invention is to provide a tool of this character including a clamp adapted to grip the frame of the window, and one edge of the replacement glass in such a manner, that when the clamp is operated to urge the glass into its frame, an even and direct pressure will be exerted on the glass, eliminating any twisting action which would tend to crack or break the glass.

Another object of the invention is to provide a tool of this character which may be adjusted for use in positioning glass in frames of various sizes and shapes.

A further important object of the invention is to provide a tool which may be used in removing the broken glass from the frame.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 4 is a sectional view taken on line 3—3 of Figure 1.

Figure 5 is a sectional view taken on line 5—5 of Figure 1.

Figure 6 is a sectional view taken on line 6—6 of Figure 1.

Figure 7 is a side elevational view of the tool used in forcing a window or glass into its frame.

Figure 8 is a plan view of the replacement tool.

Figure 9 is a detail view of the operating screw.

Figure 10 is a sectional view taken on line 10—10 of Figure 7.

Figure 11 is a sectional view taken on line 11—11 of Figure 7.

Figure 1:
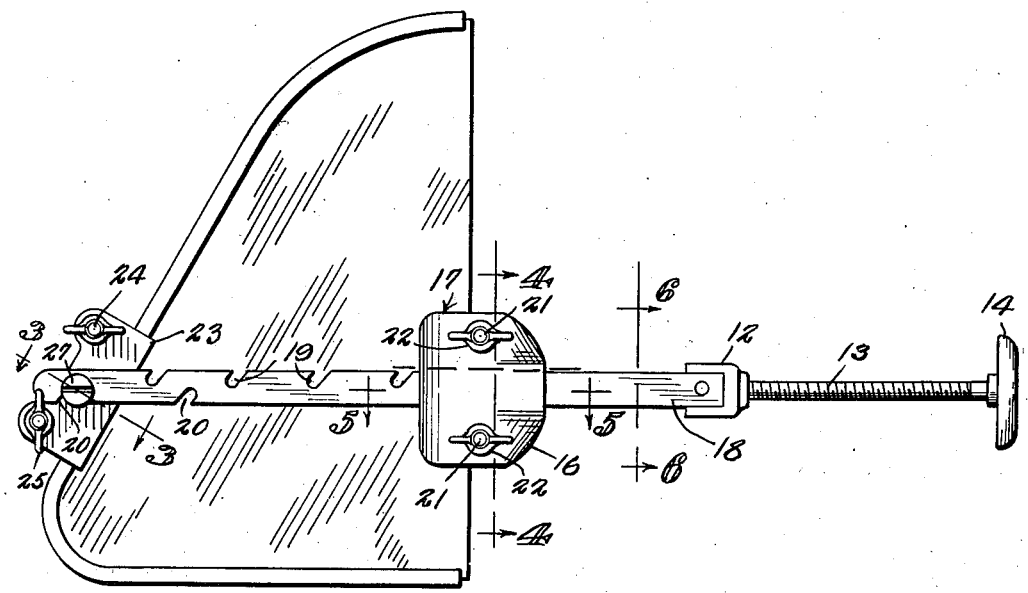
Figure 1 is an elevational view illustrating the tool clamp as positioned on the edge of the ventilating window frame from which the window or glass is being removed.
Figure 2:
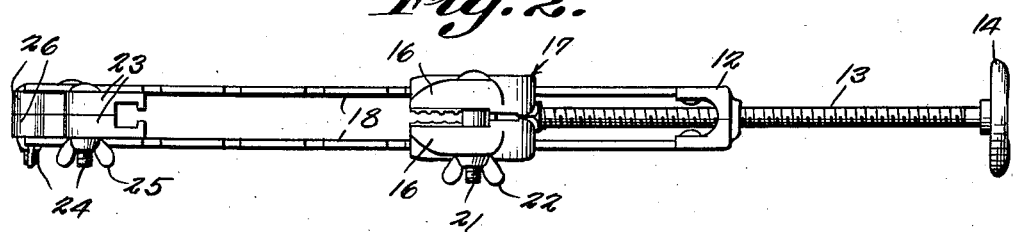
Figure 2 is a plan view of the tool.
Figure 3:
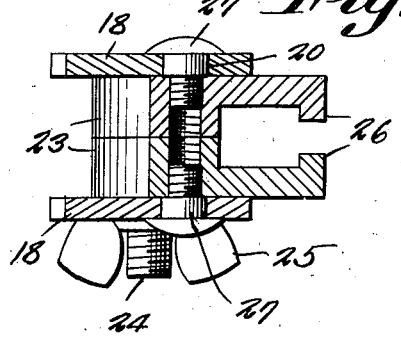
Figure 3 is a sectional view taken on line 3—3 of Figure 1.

Referring to the drawings in detail, the tool embodies the head 12 formed with a threaded opening through which the operating screw 13 moves. The inner end of the screw 13 is formed with a head which is swiveled in the plate 15 which is held between the jaws 16 of the clamp 17. The jaws 16 are formed with guideways to accommodate the arms 18 that have connection with the member 12. These arms 18 are formed with notches 19 in the upper edges thereof, the notches 19 being inclined downwardly and towards the free ends of the arms. In the lower edges of the arms 18 are notches 20 which are inclined inwardly and upwardly towards the upper edges of the arms, as clearly shown by Figure 1 of the drawings.

The jaws 16 are held together by means of the bolts 21 that are provided with wing nuts 22, whereby the jaws of the clamp may be moved with respect to each other to tightly grip the glass, when it is desired to remove the glass from its frame.

It will of course be understood that these arms 18, when in use as a device for removing or positioning a glass in a frame, are disposed on opposite sides of the glass, as shown by Figure 1. The outer ends of the arms are connected by means of the clamp which embodies separable sections 23 that are held together by means of the bolts 24 provided with wing nuts 25 for moving the sections together. At the free ends of the sections 23 are inwardly extended flanges 26 that engage the frame of the glass, to secure the outer ends of the arms 18 against movement, when the device has been positioned on a window frame to remove the glass thereof. Screws 27 extend laterally from the outer surfaces of the sections 23, the heads of the screws being spaced from the sections 23 to permit the arms 18 to be removably connected with the separable sections 23, by positioning the screws in the desired notches of the arms 18. When it is desired to remove the glass from its frame, the device is positioned over the frame in a manner as shown by Figure 1 of the drawings. The separable sections 23 are now moved into close engagement with the frame, and the clamp 17 is moved to a position to engage over the straight edge of the glass. The wing nuts 22 are now tightened to cause the rubber faced jaws of the clamp 17 to grip the straight edge of the glass. Rotary movement is now directed to the screw 13 in an anti-clockwise direction, whereupon the clamp is moved towards the member 12, with an even and direct pull, to the end that the glass is slid from its frame. It might be further stated that cushioning members are positioned on the bolts 21 to engage one end of the glass being removed, thereby eliminating any possibility of chipping or breaking the glass by its contact with the bolts 21.

To use the device as a glass replacement tool, the structure is somewhat different than the structure used for removing the glass sections from their frames. In this form of the invention, the inner end of the screw 13, which operates through the threaded member 12, is swiveled in the follower 28, which is formed with grooves in its side faces, to accommodate the faced arms 18, to guide the follower longitudinally of the arms.

A block indicated at 29 is secured to the follower, and is provided with a groove 30 which is of a width to receive one edge of the glass which is being replaced by the tool.

Used in conjunction with the arms 18, are spaced bars 31 which are connected at their upper ends, by means of the U-shaped member 32 and adapted to clamp over one edge of the frame in which the glass is being positioned.

A spring clamp 33 is secured within the U-shaped member 32 and is adapted to frictionally engage the frame, securing the stationary clamping member in position on the frame.

These bars 31 are substantially long, and in operation, rest on opposite sides of the frame and are spaced from the glass which is being positioned within the frame. Openings are arranged in the bars 31 adjacent to the lower ends thereof, the openings of one bar aligning with the openings of the other bar to receive the pintles 34 of the shoe 35, which is curved and grooved to fit over the curved corner of the frame with which the tool is used. Because the openings of the bars align, it will be seen that the bars may be readily spread apart and the shoe 35 adjusted to various positions to adapt the tool for use in connection with frames of various sizes.

Headed pins 36 extend laterally from the bars 5 and are arranged in spaced relation with respect to each other, the pins of the bars at opposite sides of the frame, being disposed directly opposite to each other, for purposes to be hereinafter more fully described. The U-shaped member 32 is pivotally connected to the bars 31, so that it may automatically adjust itself, when it is moved over the frame, adjusting itself to the curvature of the frame.

In using the tool for replacing glass in a frame, the arms 18 are positioned in a manner as shown by Figure 7 of the drawings, and the notches along one edge of the arms 18, are positioned over the pins 36. When the screw 13 is rotated in a clockwise direction, pressure is directed to the block 29 which is fitted against one edge of the glass. As the block 29 is moved inwardly, the glass is forced into its frame.

What is claimed is:

A tool for positioning a glass window in its frame, comprising a frame engaging member embodying a pair of arms adapted to rest on opposite sides of the window, a frame clamp to which the arms are pivotally connected, a member adjustably connected to the arms and adapted to fit over one corner of the frame, a pair of arms operating at substantially right angles to the first-mentioned arms, means for removably connecting the latter arms to the first-mentioned arms, a block slidably mounted between the last-mentioned arms and having a groove for the reception of the edge of the window, and a screw adapted to move the block longitudinally of the latter arms for exerting pressure on the window and moving the window into its frame.

WILLIAM F. ROBERTS.